United States Patent
Shen et al.

(10) Patent No.: US 12,306,678 B2
(45) Date of Patent: May 20, 2025

(54) ELECTRONIC DEVICE, ROTATING MODULE AND PIVOT STRUCTURE

(71) Applicant: Wistron Corporation, New Taipei (TW)

(72) Inventors: Sheng-Hsing Shen, New Taipei (TW); Xu Zhang, New Taipei (TW); Xiaoyong Zhang, New Taipei (TW); Chih-Wei Chueh, New Taipei (TW)

(73) Assignee: Wistron Corporation, New Taipei (TW)

( * ) Notice: Subject to any disclaimer, the term of this patent is extended or adjusted under 35 U.S.C. 154(b) by 303 days.

(21) Appl. No.: 17/838,255

(22) Filed: Jun. 12, 2022

(65) Prior Publication Data

US 2023/0266801 A1    Aug. 24, 2023

(30) Foreign Application Priority Data

Feb. 22, 2022   (CN) ......................... 202210163783.X

(51) Int. Cl.
*G06F 1/16* (2006.01)

(52) U.S. Cl.
CPC .......... *G06F 1/1681* (2013.01); *G06F 1/1601* (2013.01); *G06F 1/1616* (2013.01)

(58) Field of Classification Search
None
See application file for complete search history.

(56) References Cited

U.S. PATENT DOCUMENTS

| | | | |
|---|---|---|---|
| 8,120,716 B2 * | 2/2012 | Vitito | G06F 1/1622 348/837 |
| 8,230,707 B2 * | 7/2012 | Hung | E05B 73/0082 70/58 |

FOREIGN PATENT DOCUMENTS

CN            2430566 Y      5/2001

* cited by examiner

*Primary Examiner* — Anthony Q Edwards
*Assistant Examiner* — Rashen E Morrison
(74) *Attorney, Agent, or Firm* — Winston Hsu

(57) ABSTRACT

An electronic device includes a device body and a rotating module. The device body includes a first pivot hole. The rotating module includes a first fixing structure and a first pivot structure. The first pivot structure includes at least one elastic arm, at least one protruding portion and a fixing portion. The at least one elastic arm and the fixing portion are respectively located at opposite sides of the first pivot structure. The at least one protruding portion respectively extends from the at least one elastic arm. The fixing portion is fixed to the first fixing structure. The at least one elastic arm is disposed in the first pivot hole. The at least one protruding portion abuts against an inner wall of the first pivot hole.

16 Claims, 19 Drawing Sheets

ELECTRONIC DEVICE, ROTATING MODULE AND PIVOT STRUCTURE

BACKGROUND OF THE DISCLOSURE

1. Field of the Disclosure

The disclosure relates to a pivot structure and, more particularly, to a pivot structure with simple structure and convenient to be assembled and disassembled, and a rotating module and an electronic device equipped with the pivot structure.

2. Description of the Prior Art

At present, various electronic devices utilize a hinge to pivotally connect a rotating module (e.g. display, camera, support frame, cover, etc.) to a device body, such that the rotating module can rotate with respect to the device body through the hinge to be opened or closed, and the rotating module can stop at a specific position with respect to the device body through torsion generated by the hinge. The structure of the conventional hinge is complicated and the torsion cannot be adjusted. When the hinge needs to be replaced, the cost of the hinge is high and a user cannot assemble and disassemble the hinge easily.

SUMMARY OF THE DISCLOSURE

The disclosure provides a pivot structure with simple structure and convenient to be assembled and disassembled, and a rotating module and an electronic device equipped with the pivot structure, so as to solve the aforesaid problems.

According to an embodiment of the disclosure, an electronic device comprises a device body and a rotating module. The device body comprises a first pivot hole. The rotating module comprises a first fixing structure and a first pivot structure. The first pivot structure comprises at least one elastic arm, at least one protruding portion and a fixing portion. The at least one elastic arm and the fixing portion are respectively located at opposite sides of the first pivot structure. The at least one protruding portion respectively extends from the at least one elastic arm. The fixing portion is fixed to the first fixing structure. The at least one elastic arm is disposed in the first pivot hole. The at least one protruding portion abuts against an inner wall of the first pivot hole.

According to another embodiment of the disclosure, a rotating module comprises a first fixing structure and a first pivot structure. The first pivot structure comprises at least one elastic arm, at least one protruding portion and a fixing portion. The at least one elastic arm and the fixing portion are respectively located at opposite sides of the first pivot structure. The at least one protruding portion respectively extends from the at least one elastic arm. The fixing portion is fixed to the first fixing structure.

According to another embodiment of the disclosure, a pivot structure comprises a base, a head portion, at least one elastic arm, at least one protruding portion and a fixing portion. The head portion is detachably connected to the base. The at least one elastic arm is located at the head portion. The at least one protruding portion is located at the head portion and respectively extends from the at least one elastic arm. The fixing portion is located at the base. The at least one elastic arm and the fixing portion are respectively located at opposite sides of the pivot structure.

As mentioned in the above, the pivot structure of the disclosure essentially consists of the elastic arm, the protruding portion and the fixing portion, such that the structure is very simple. Furthermore, the pivot structure is fixed to the fixing structure of the rotating module by the fixing portion, such that it is very convenient for assembly and disassembly. When the rotating module rotates with respect to the device body, the pivot structure provides torsion by friction between the protruding portion on the elastic arm and the pivot hole of the device body, such that the rotating module may stop at a specific position with respect to the device body. Accordingly, the disclosure may adjust the torsion of the pivot structure by changing the material of the pivot structure, the thickness and the width of the elastic arm, and/or the position of the protruding portion, such that the pivot structure is more flexible in use.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
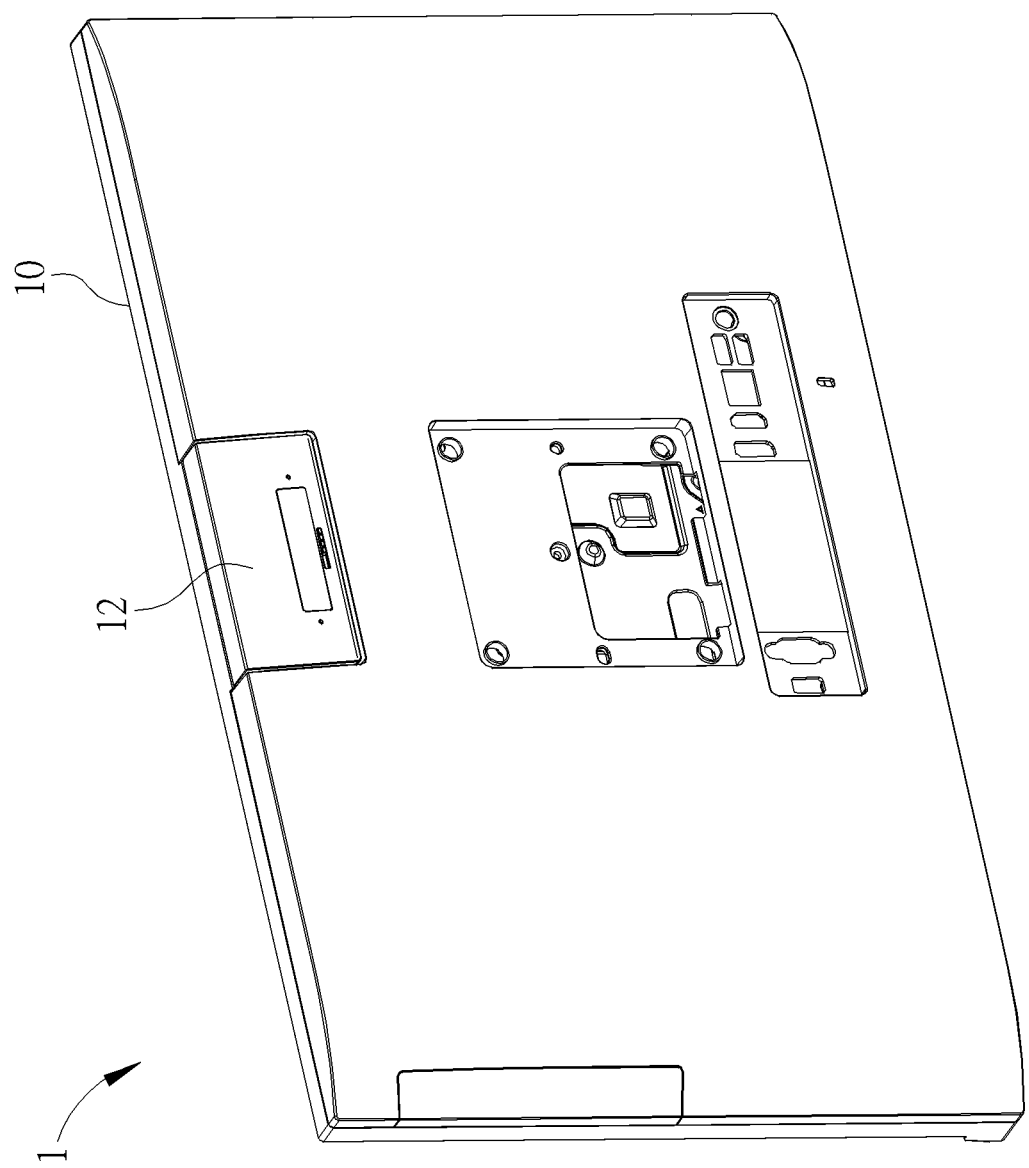
FIG. 1 is a perspective view illustrating an electronic device according to an embodiment of the disclosure.
Figure 2:
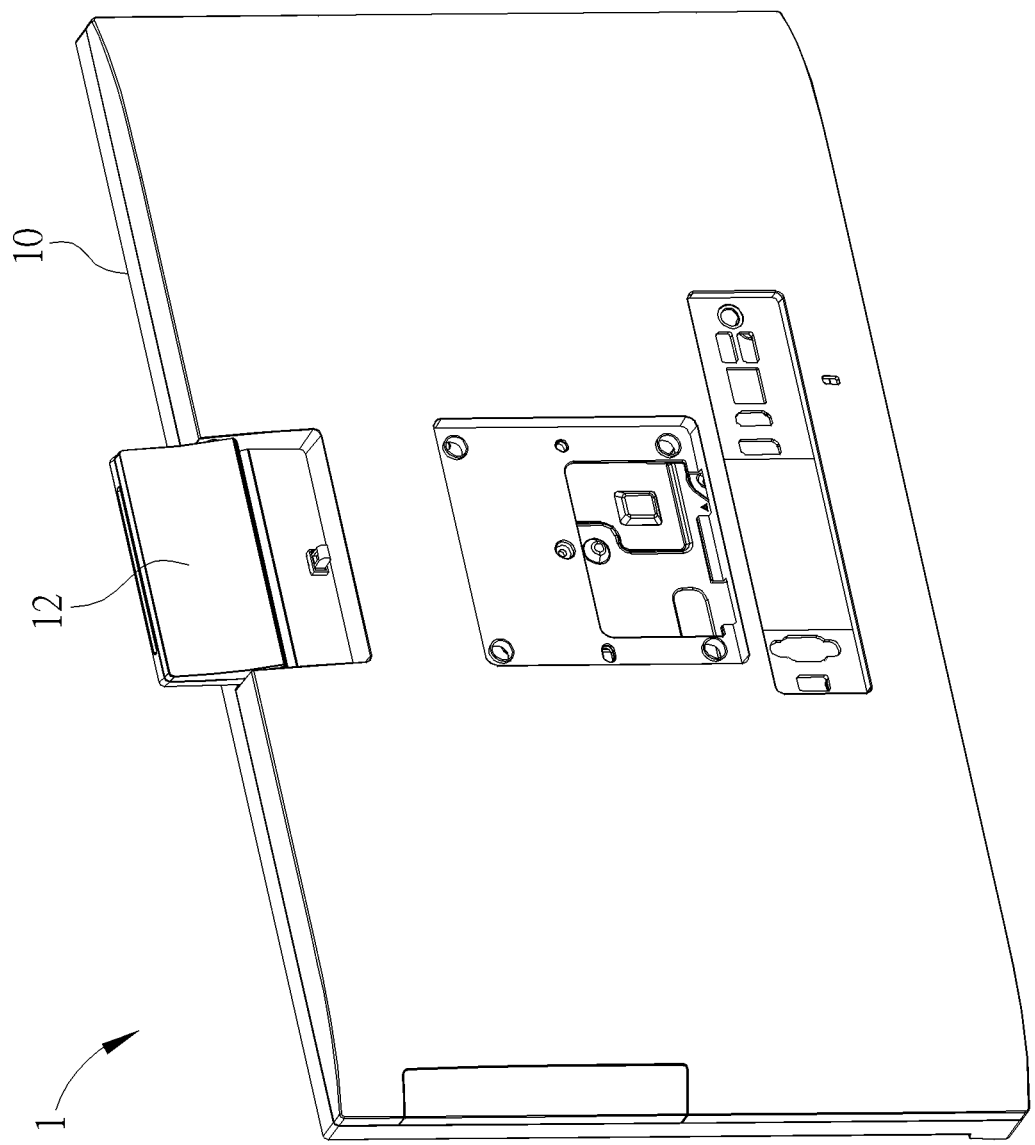
FIG. 2 is a perspective view illustrating a rotating module shown in FIG. 1 being opened with respect to a device body.
Figure 3:
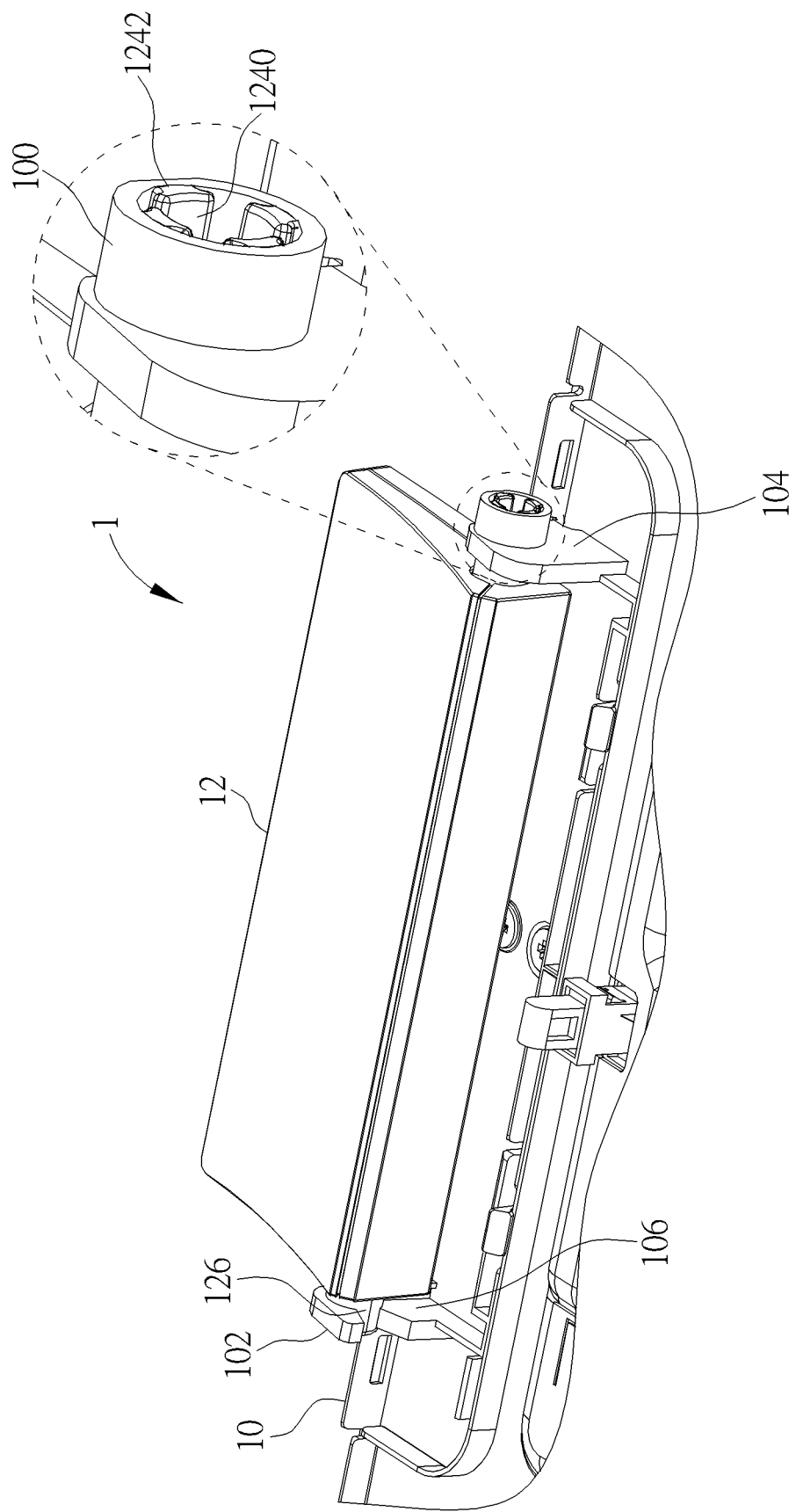
FIG. 3 is a perspective view illustrating parts of the inside of the device body shown in FIG. 2.
Figure 4:
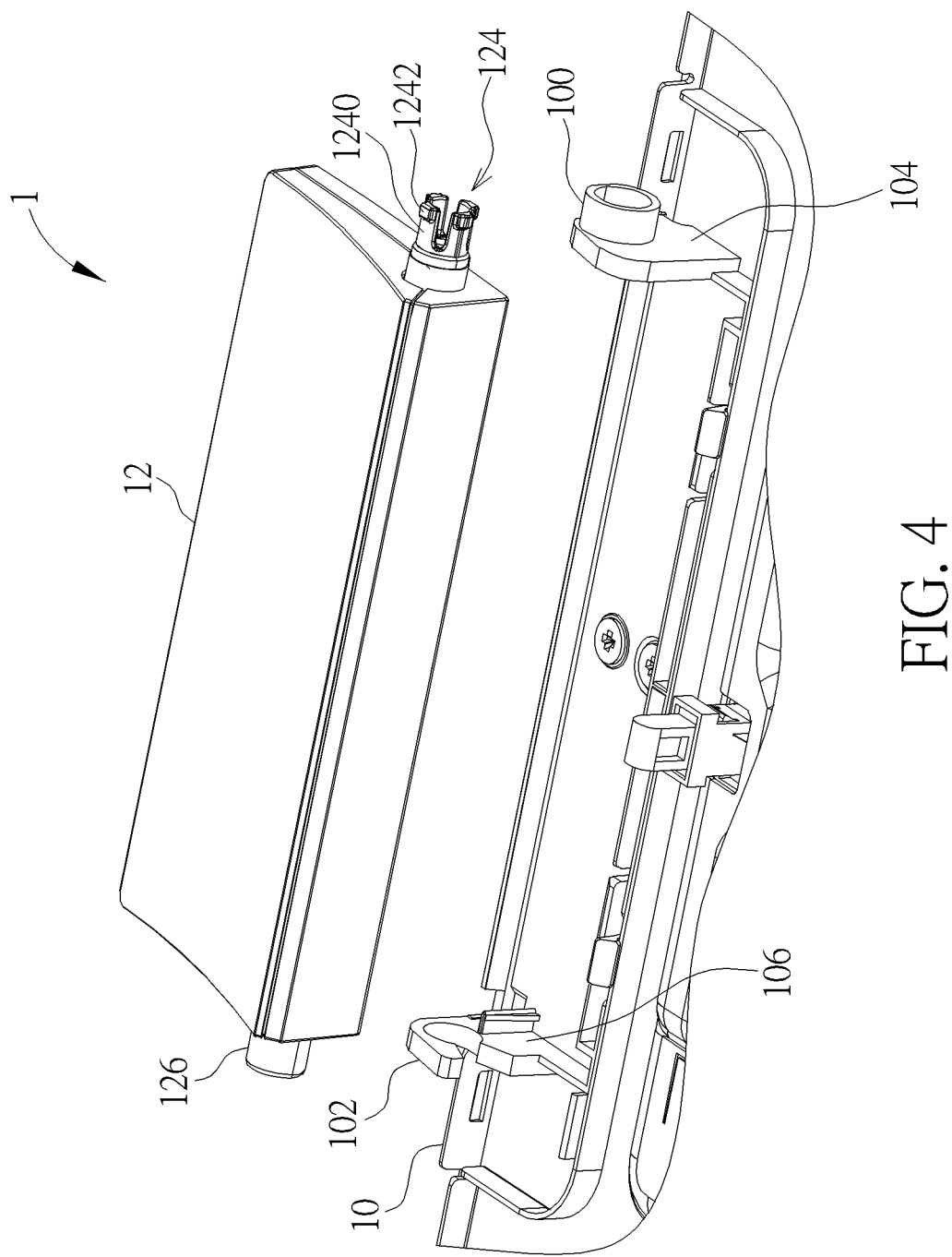
FIG. 4 is an exploded view illustrating the device body and the rotating module shown in FIG. 3.
Figure 5:
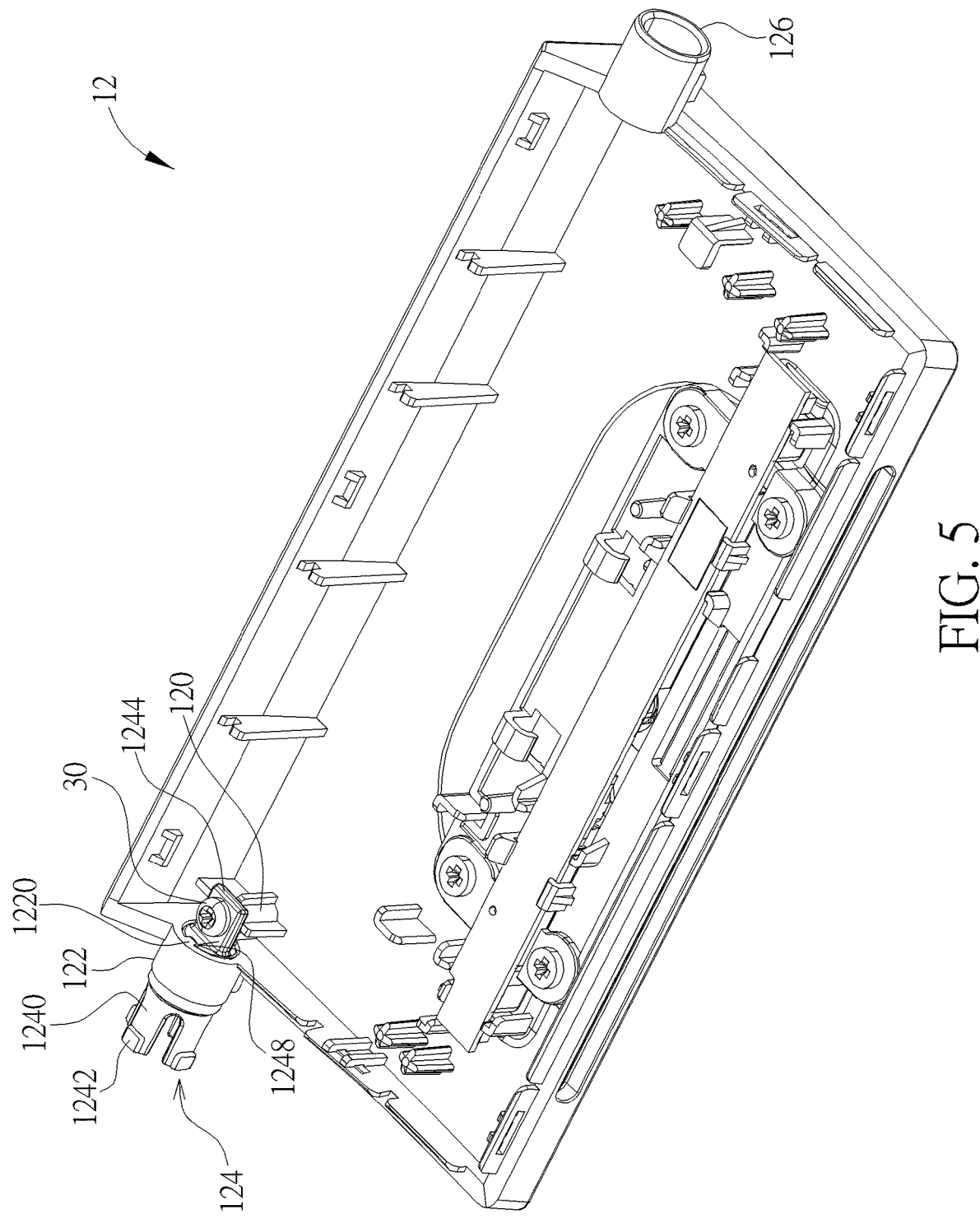
FIG. 5 is a perspective view illustrating the inside of the rotating module shown in FIG. 4 from another viewing angle.
Figure 6:
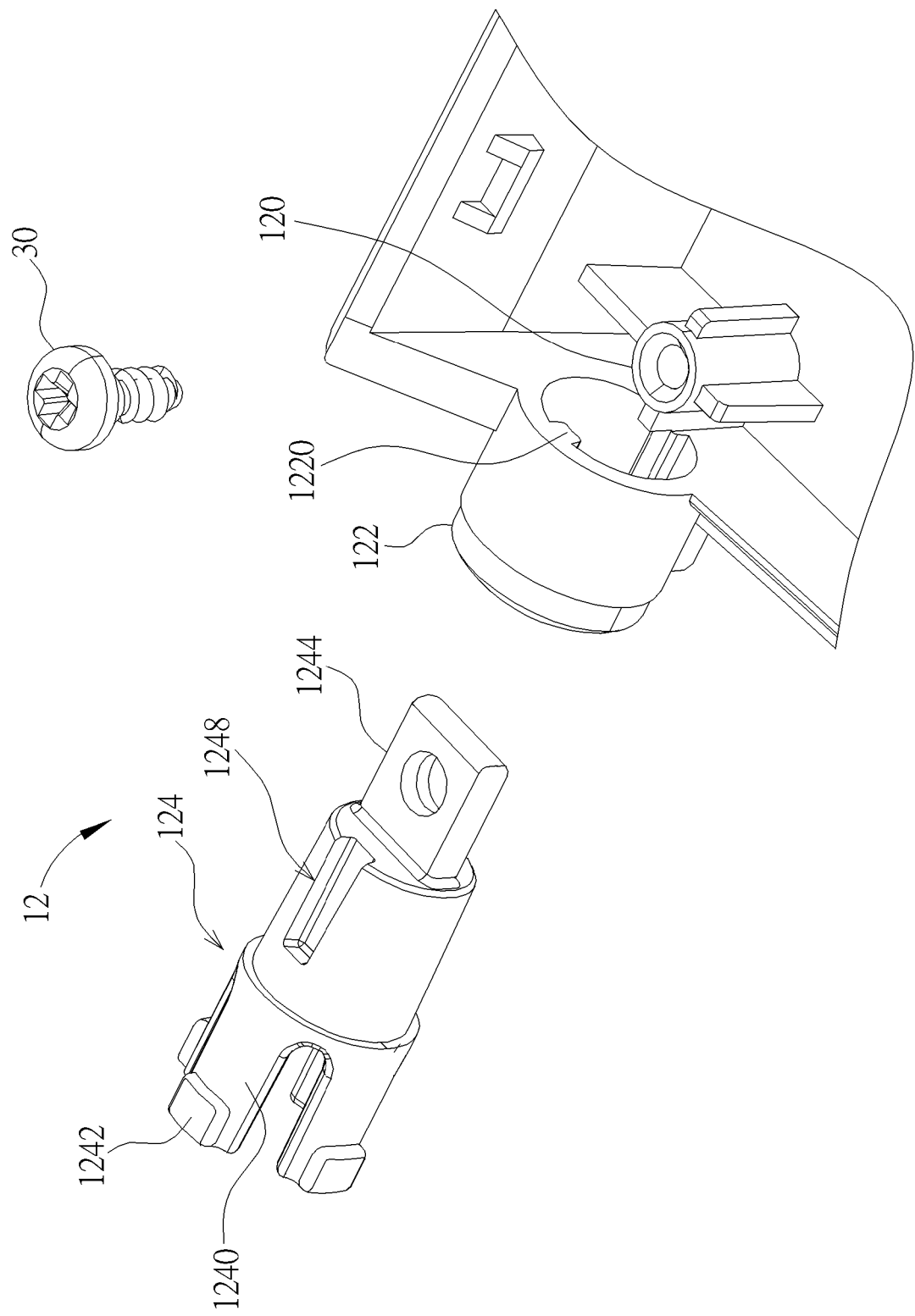
FIG. 6 is an exploded view illustrating parts of the rotating module shown in FIG. 5.
Figure 7:
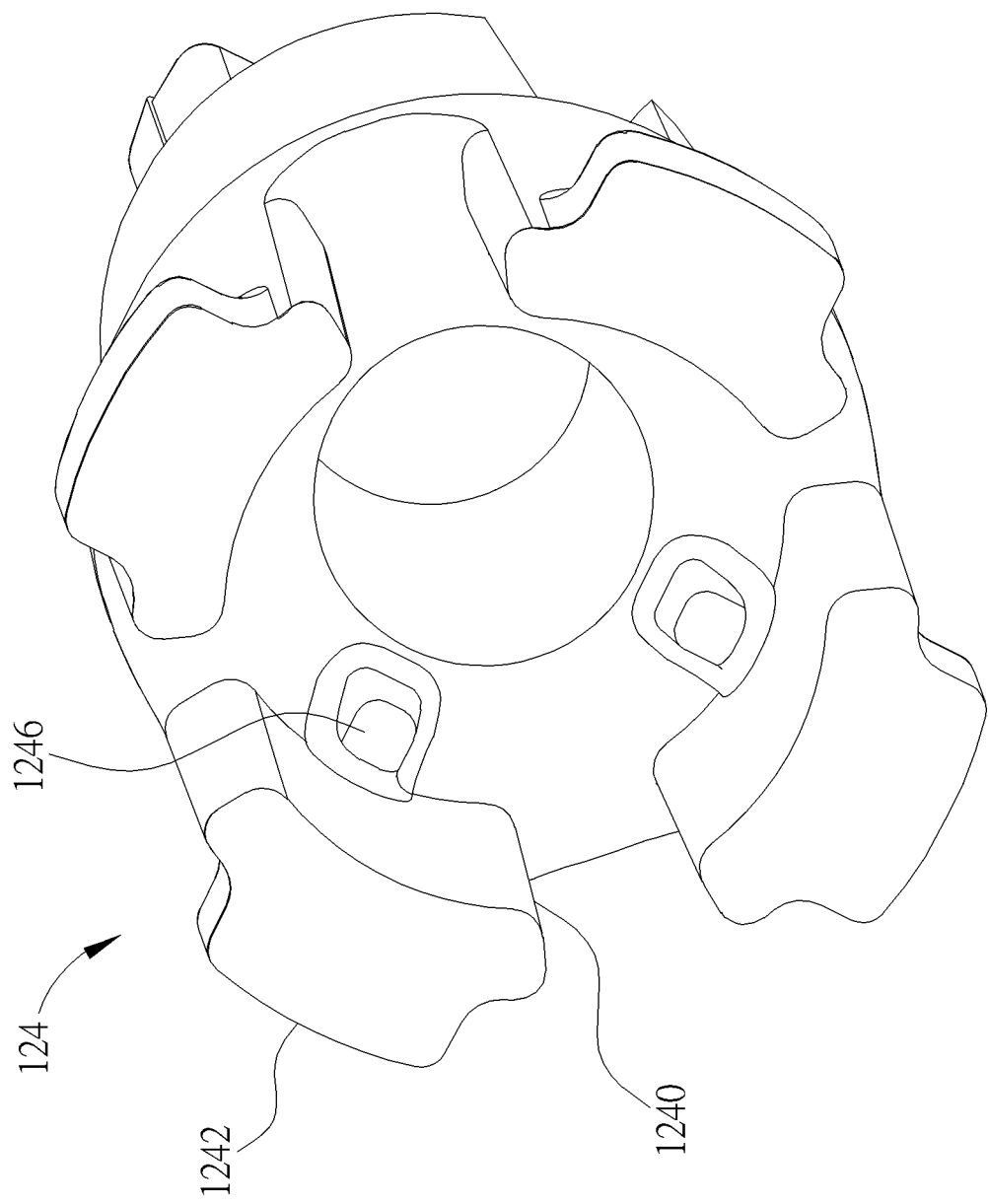
FIG. 7 is a perspective view illustrating a first pivot structure shown in FIG. 6 from another viewing angle.

Referring to FIGS. 1 to 7, FIG. 1 is a perspective view illustrating an electronic device 1 according to an embodiment of the disclosure, FIG. 2 is a perspective view illustrating a rotating module 12 shown in FIG. 1 being opened with respect to a device body 10, FIG. 3 is a perspective view illustrating parts of the inside of the device body 10 shown in FIG. 2, FIG. 4 is an exploded view illustrating the device body 10 and the rotating module 12 shown in FIG. 3, FIG. 5 is a perspective view illustrating the inside of the rotating module 12 shown in FIG. 4 from another viewing angle, FIG. 6 is an exploded view illustrating parts of the rotating module 12 shown in FIG. 5, and FIG. 7 is a perspective view illustrating a first pivot structure 124 shown in FIG. 6 from another viewing angle.

As shown in FIGS. 1 and 2, an electronic device 1 comprises a device body 10 and a rotating module 12. The rotating module 12 is pivotally connected to the device body 10, such that the rotating module can rotate with respect to the device body 10 to be opened or closed. In this embodiment, the device body 10 maybe an all-in-one (AIO) computer and the rotating module 12 may be a camera. In another embodiment, the device body 10 may be a base of a notebook computer and the rotating module 12 may be a display of the notebook computer. In another embodiment, the device body 10 may be a tablet computer, a smart phone or other mobile devices, and the rotating module 12 may be a support frame. In another embodiment, the device body 10 may be a casing of any electronic devices and the rotating module 12 may be a cover. It should be noted that the types of the device body 10 and the rotating module 12 may be determined according to practical applications, so the disclosure is not limited to the aforesaid embodiments.

As shown in FIGS. 3 and 4, the device body 10 comprises a first pivot hole 100 and a second pivot hole 102, wherein the first pivot hole 100 is a circular hole and the second pivot hole 102 is a C-shaped hole. The first pivot hole 100 and the second pivot hole 102 are disposed opposite to each other. In this embodiment, the first pivot hole 100 may be formed on a first pivot socket 104 of the device body 10 and the second pivot hole 102 may be formed on a second pivot socket 106 of the device body 10.

As shown in FIGS. 3 to 6, the rotating module 12 comprises a first fixing structure 120, a first through hole 122, a first pivot structure 124 and a pivot portion 126. In this embodiment, the first fixing structure 120, the first through hole 122 and the pivot portion 126 may be integrally formed on a casing of the rotating module 12, wherein the first fixing structure 120 and the first through hole 122 are located at a side of the rotating module 12, and the pivot portion 126 is located at another side of the rotating module 12.

The first pivot structure 124 comprises at least one elastic arm 1240, at least one protruding portion 1242 and a fixing portion 1244, wherein the at least one elastic arm 1240 and the fixing portion 1244 are respectively located at opposite sides of the first pivot structure 124, and the at least one protruding portion 1242 respectively extends from the at least one elastic arm 1240. Furthermore, the first pivot structure 124 may further comprise at least one reinforcing rib 1246, wherein the at least one reinforcing rib 1246 respectively extends from a bottom of the at least one elastic arm 1240, as shown in FIG. 7. In this embodiment, the first pivot structure 124 may comprise four elastic arms 1240, four protruding portions 1242 and four reinforcing ribs 1246, wherein each of the protruding portions 1242 respectively extends from one of the four elastic arms 1240, and each of the reinforcing ribs 1246 respectively extends from the bottom of one of the four elastic arms 1240. It should be noted that the number of the elastic arms 1240, the protruding portions 1242 and the reinforcing ribs 1246 may be determined according to practical applications, so the disclosure is not limited to the embodiment shown in the figures. The reinforcing rib 1246 may increase the moment of inertia of the elastic arm 1240 to increase an elastic force of the elastic arm 1240. If the elastic force of the elastic arm 1240 itself has satisfied has been enough, the reinforcing rib 1246 may be omitted.

The fixing portion 1244 of the first pivot structure 124 passes through the first through hole 122 to be fixed to the first fixing structure 120. At this time, at least a part of the first pivot structure 124 is located in the first through hole 122 and the first through hole 122 is located between the protruding portion 1242 and the fixing portion 1244. In this embodiment, the fixing portion 1244 of the first pivot structure 124 may be a through hole and the first fixing structure 120 may be screw hole. Thus, as shown in FIGS. 5 and 6, the disclosure may screw a screw 30 into the first fixing structure 120 through the fixing portion 1244, such that the fixing portion 1244 of the first pivot structure 124 is fixed to the first fixing structure 120.

In this embodiment, the first through hole 122 may comprise a positioning rib 1220 and the first pivot structure 124 may comprise a positioning groove 1248. The positioning groove 1248 of the first pivot structure 124 is located between the elastic arm 1240 and the fixing portion 1244. When the fixing portion 1244 of the first pivot structure 124 passes through the first through hole 122, the positioning rib 1220 is aligned with and enters the positioning groove 1248, such that the positioning rib 1220 cooperates with the positioning groove 1248 to position the first pivot structure 124 in the first through hole 122. In another embodiment, the first through hole 122 may also comprise the positioning groove 1248 and the first pivot structure 124 may also comprise the positioning rib 1220. At this time, the positioning rib 1220 is located between the elastic arm 1240 and the fixing portion 1244. In other words, one of the first pivot structure 124 and the first through hole 122 may comprise the positioning rib 1120, the other one of the first pivot structure 124 and the first through hole 122 may comprise the positioning groove 1248, and it depends on practical applications. Furthermore, the number of the positioning rib 1220 and the positioning groove 1248 may be one or more according to practical applications. In another embodiment, the positioning rib 1220 and the positioning groove 1248 may also be omitted.

After the fixing portion 1244 of the first pivot structure 124 is fixed to the first fixing structure 120, the first pivot structure 124 and the pivot portion 126 are respectively located at opposite sides of the rotating module 12. To assemble the rotating module 12 to the device body 10, a user may insert the elastic arm 1240 of the first pivot structure 124 into the first pivot hole 100 first. Then, the user can dispose the pivot portion 126 of the rotating module 12 into the second pivot hole 102. To disassemble the rotating module 12 from the device body 10, the user may detach the pivot portion 126 of the rotating module 12 from the second pivot hole 102 first. Then, the user can pull the elastic arm 1240 of the first pivot structure 124 out of the first pivot hole 100. Accordingly, the rotating module 12 of the disclosure is very convenient to be assembled and disassembled.

After the rotating module 12 is assembled to the device body 10, the elastic arm 1240 of the first pivot structure 124 is disposed in the first pivot hole 100 and the protruding portion 1242 on the elastic arm 1240 abuts against an inner wall of the first pivot hole 100, as shown in FIG. 3. At the same time, the pivot portion 126 is disposed in the second pivot hole 102. When the rotating module 12 rotates with respect to the device body 10, the first pivot structure 124 provides torsion by friction between the protruding portion 1242 on the elastic arm 1240 and the first pivot hole 100 of the device body 10, such that the rotating module 12 may stop at a specific position with respect to the device body 10. The first pivot structure 124 of the disclosure essentially consists of the elastic arm 1240, the protruding portion 1242 and the fixing portion 1244, such that the structure is very simple. Furthermore, the disclosure may adjust the torsion of the first pivot structure 124 by changing the material of the first pivot structure 124, the thickness and the width of the elastic arm 1240, and/or the position of the protruding portion 1242, such that the first pivot structure 124 is more flexible in use.

Figure 8:
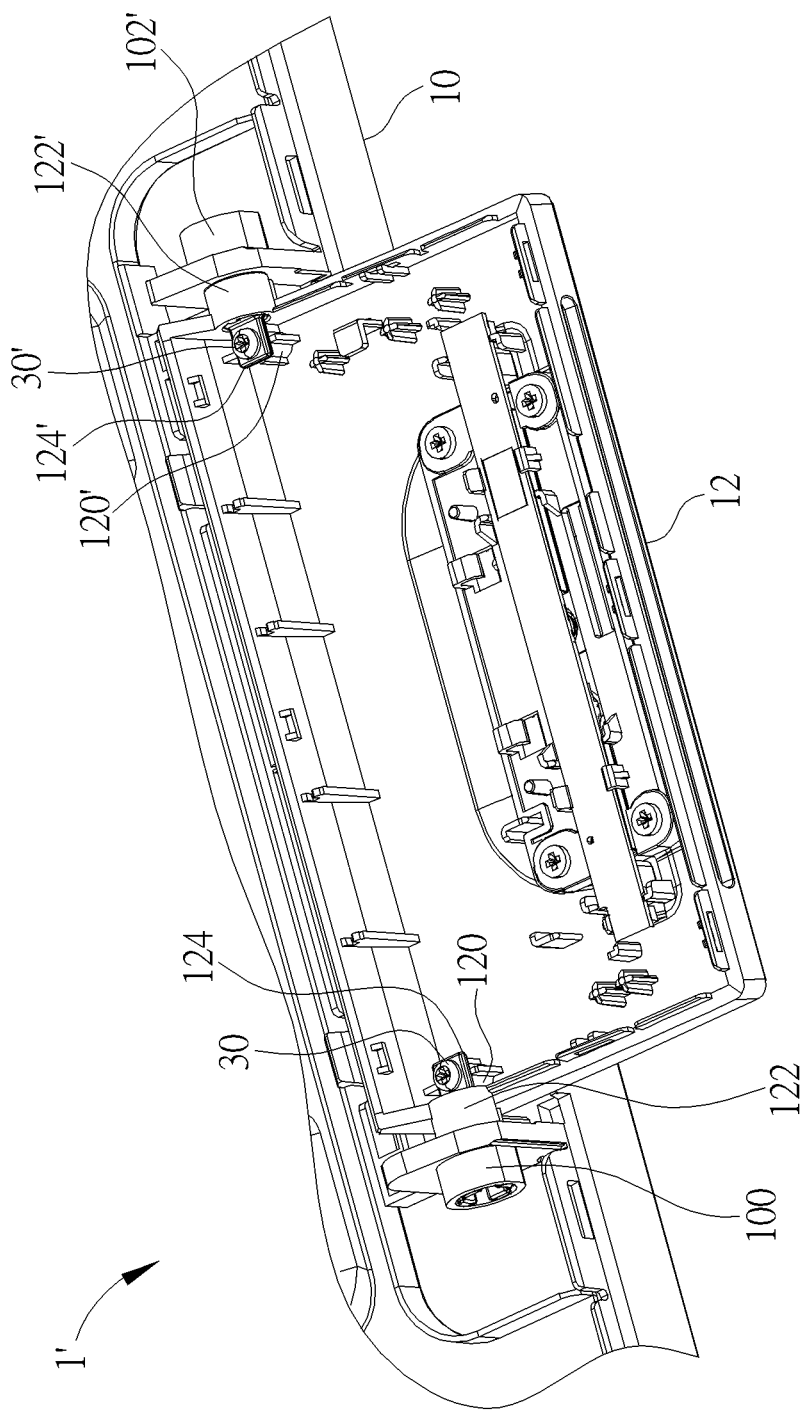
FIG. 8 is a perspective view illustrating parts of the inside of an electronic device according to another embodiment of the disclosure.
Figure 9:
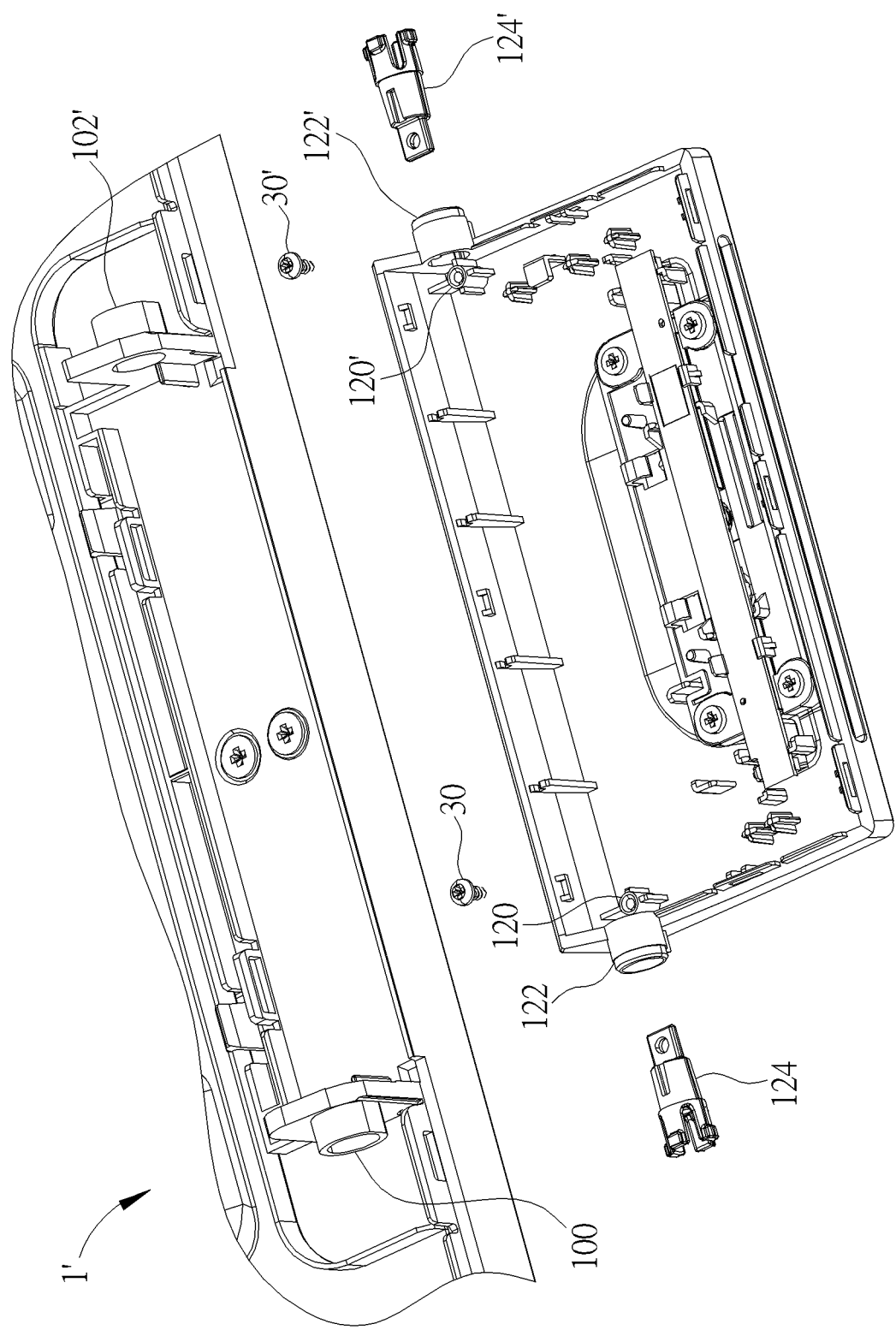
FIG. 9 is an exploded view illustrating the electronic device shown in FIG. 8.

Referring to FIGS. 8 and 9, FIG. 8 is a perspective view illustrating parts of the inside of an electronic device 1' according to another embodiment of the disclosure, and FIG. 9 is an exploded view illustrating the electronic device 1' shown in FIG. 8.

The main difference between the electronic device 1' and the aforesaid electronic device 1 is that the device body 10 of the electronic device 1' further comprises a second pivot hole 102' and the rotating module 12 of the electronic device 1' further comprises a second fixing structure 120', a second through hole 122' and a second pivot structure 124', as shown in FIGS. 8 and 9. In this embodiment, the arrangement of the second pivot hole 102', the second fixing structure 120', the second through hole 122' and the second pivot structure 124' is the same as the arrangement of the first pivot hole 102, the first fixing structure 120, the first through hole 122 and the first pivot structure 124 mentioned in the above, and the first pivot structure 124 and the second pivot structure 124' are respectively located at opposite sides of the rotating module 12. The disclosure may utilize another screw 30' to fix the second pivot structure 124' to the second fixing structure 120'. In other words, the electronic device 1' may replace the second pivot hole 102 and the pivot portion 126 of the electronic device 1 by the second pivot hole 102', the second fixing structure 120', the second through hole 122' and the second pivot structure 124'. The principle of the second pivot structure 124' is the same as the principle of the first pivot structure 124, so the repeated explanation will not be depicted herein again.

Figure 10:
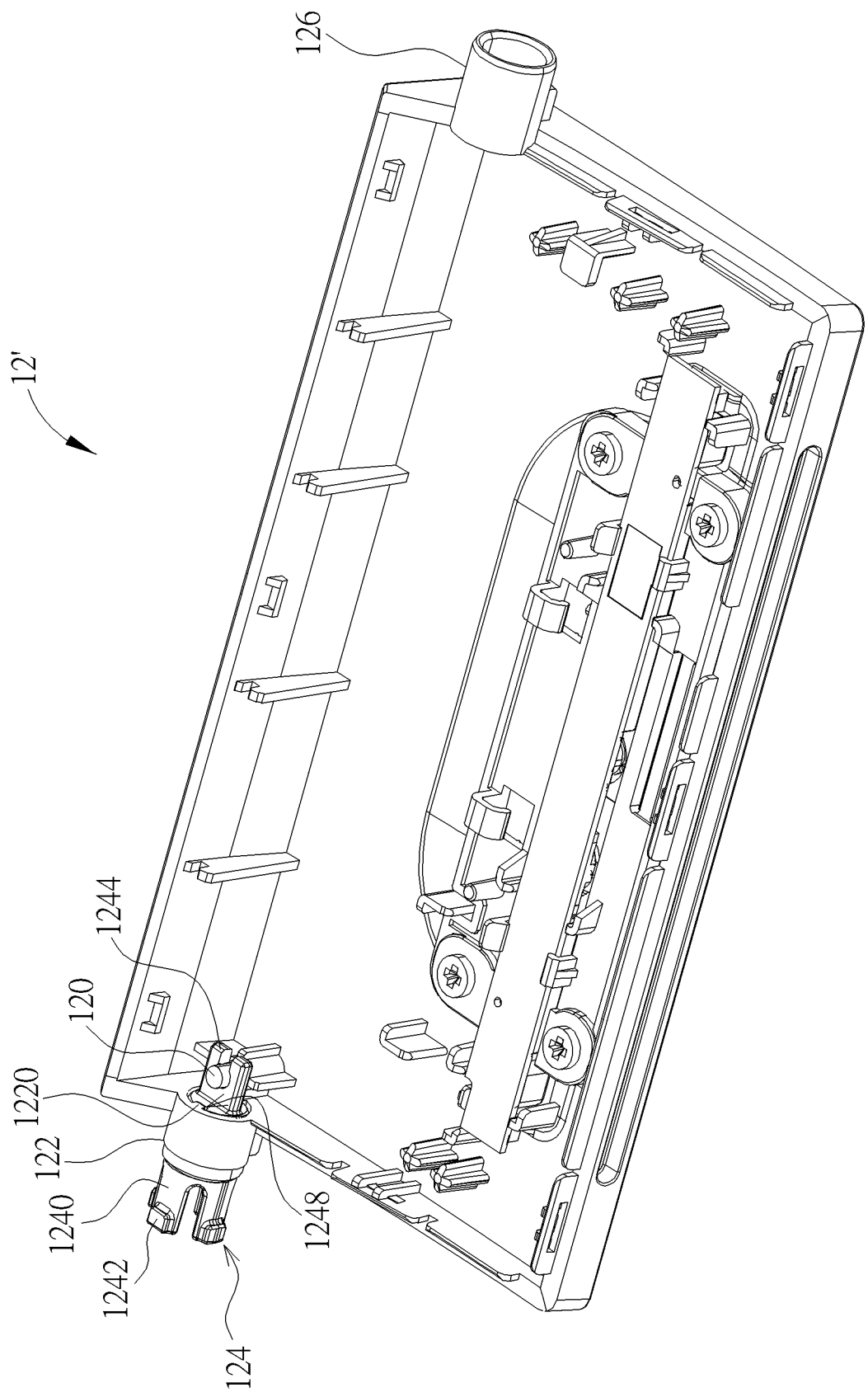
FIG. 10 is a perspective view illustrating the inside of a rotating module according to another embodiment of the disclosure.
Figure 11:
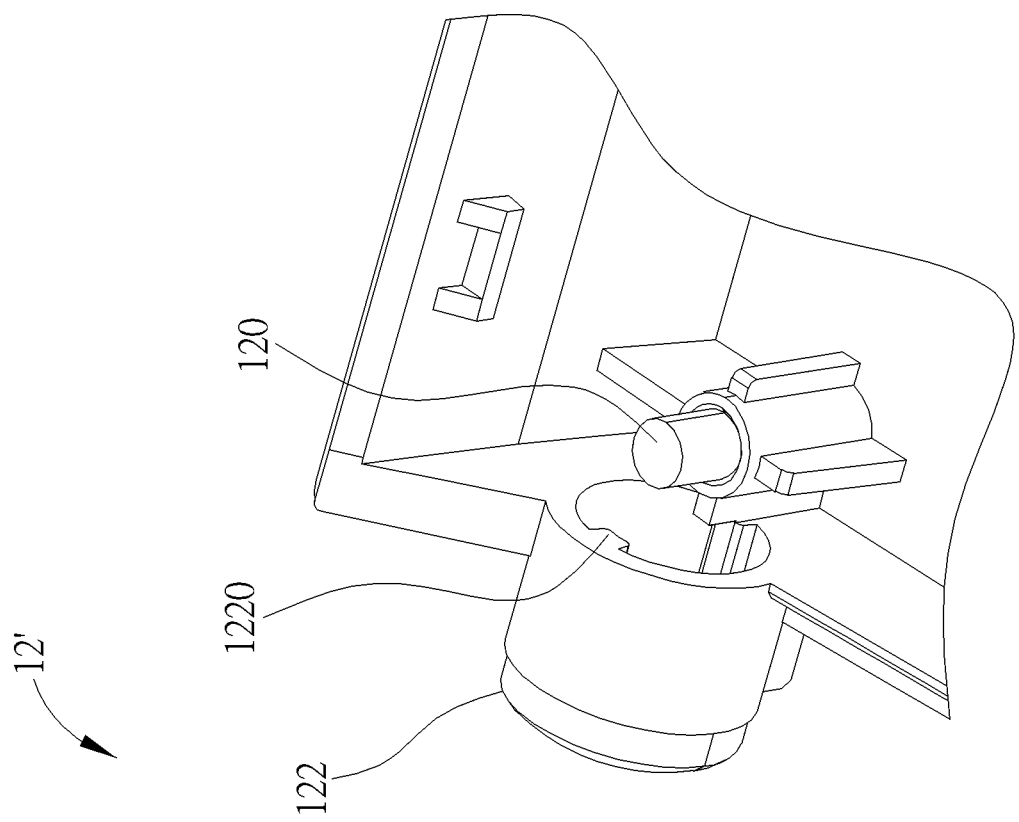
FIG. 11 is an exploded view illustrating parts of the rotating module shown in FIG. 10.
Figure 11:
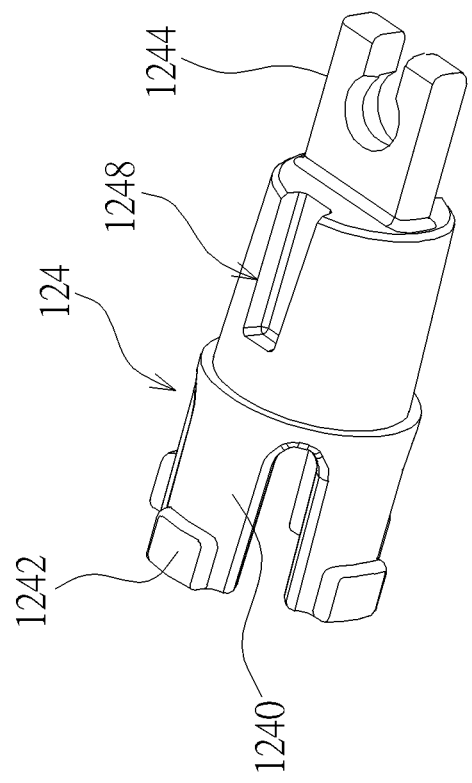

Referring to FIGS. 10 and 11, FIG. 10 is a perspective view illustrating the inside of a rotating module 12' according to another embodiment of the disclosure, and FIG. 11 is an exploded view illustrating parts of the rotating module 12' shown in FIG. 10.

The main difference between the rotating module 12' and the aforesaid rotating module 12 is that the fixing portion 1244 of the first pivot structure 124 of the rotating module 12' is an engaging recess and the first fixing structure 120 of the rotating module 12' is a protruding pillar, as shown in FIGS. 10 and 11. Accordingly, the fixing portion 1244 of the first pivot structure 124 may engage with the first fixing structure 120, such that the fixing portion 1244 of the first pivot structure 124 is fixed to the first fixing structure 120.

In another embodiment, the second fixing structure 120' and the second pivot structure 124' shown in FIGS. 8 and 9 may also be replaced by the first fixing structure 120 and the first pivot structure 124 shown in FIGS. 10 and 11.

Figure 12:
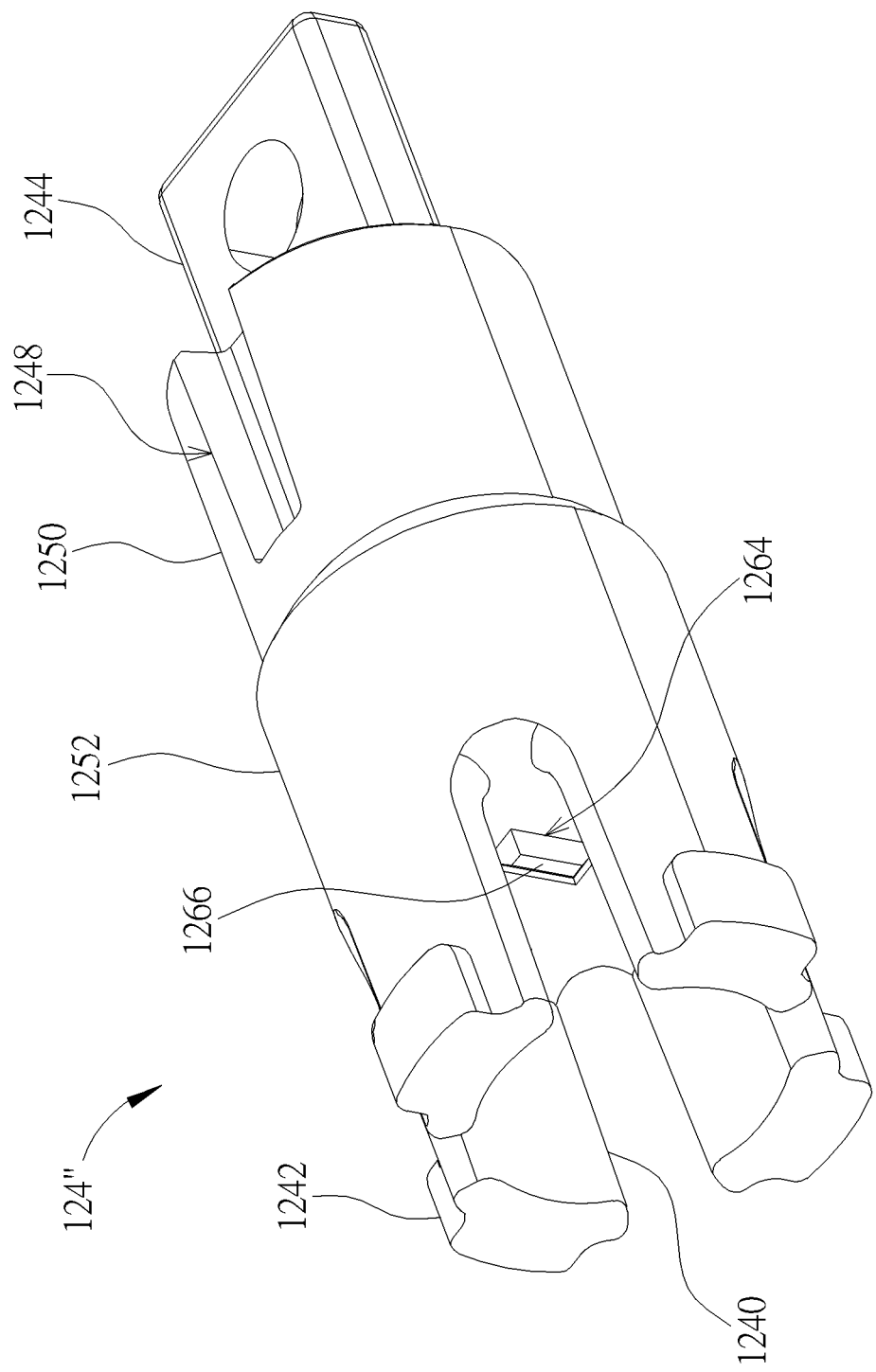
FIG. 12 is a perspective view illustrating a first pivot structure according to another embodiment of the disclosure.
Figure 13:
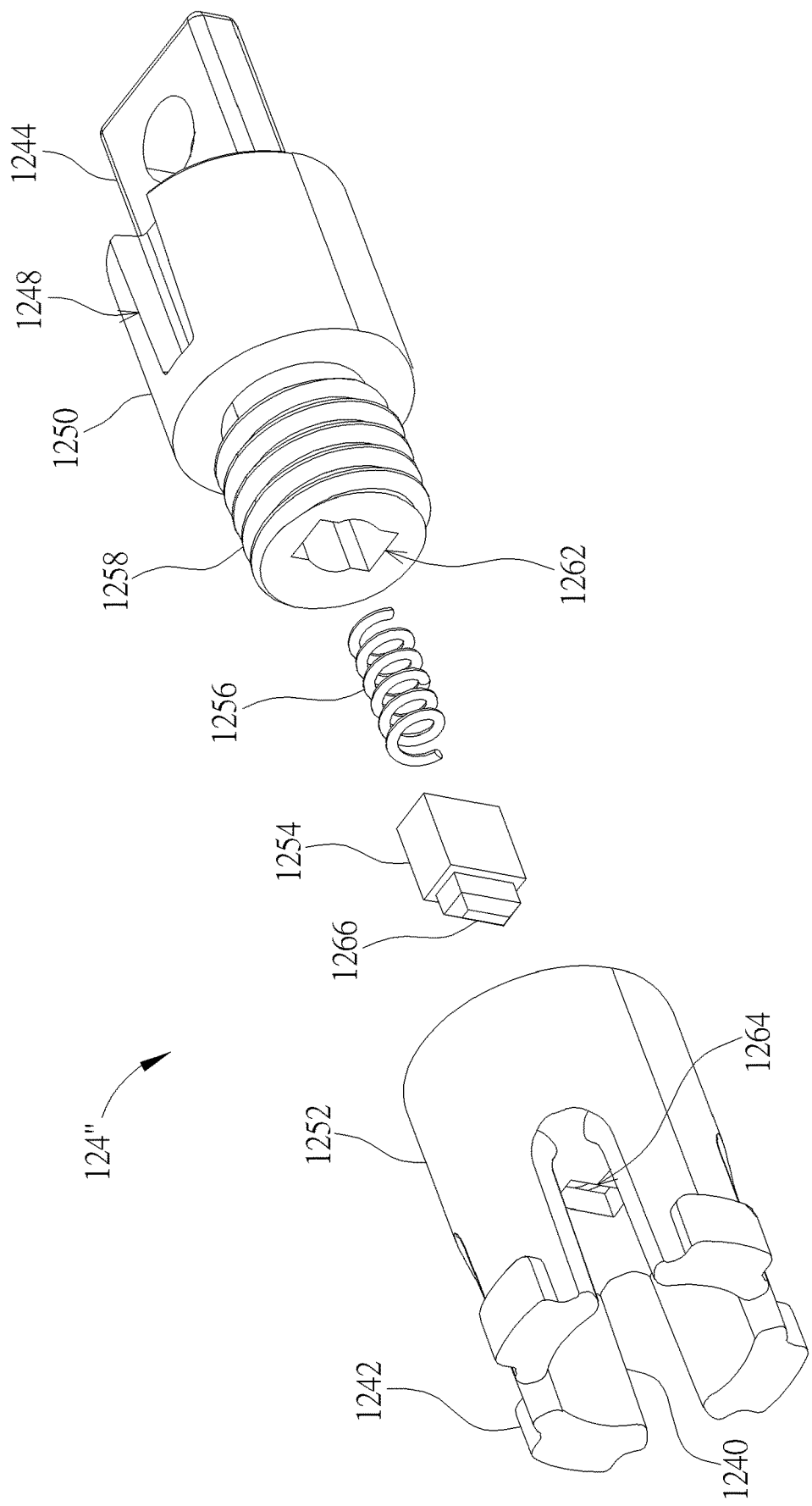
FIG. 13 is an exploded view illustrating the first pivot structure shown in FIG. 12.
Figure 14:
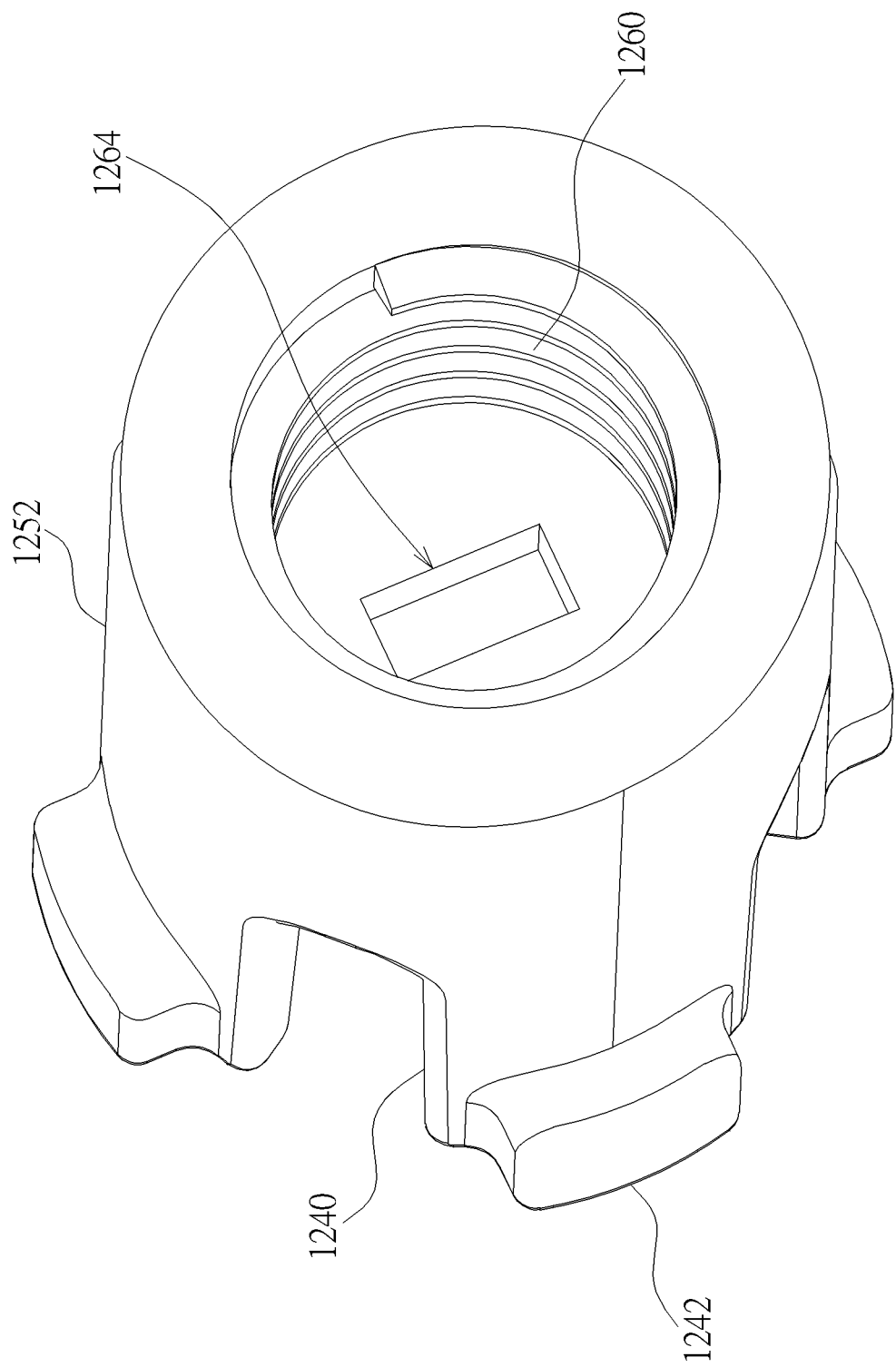
FIG. 14 is a perspective view illustrating a head portion shown in FIG. 12 from another viewing angle.
Figure 15:
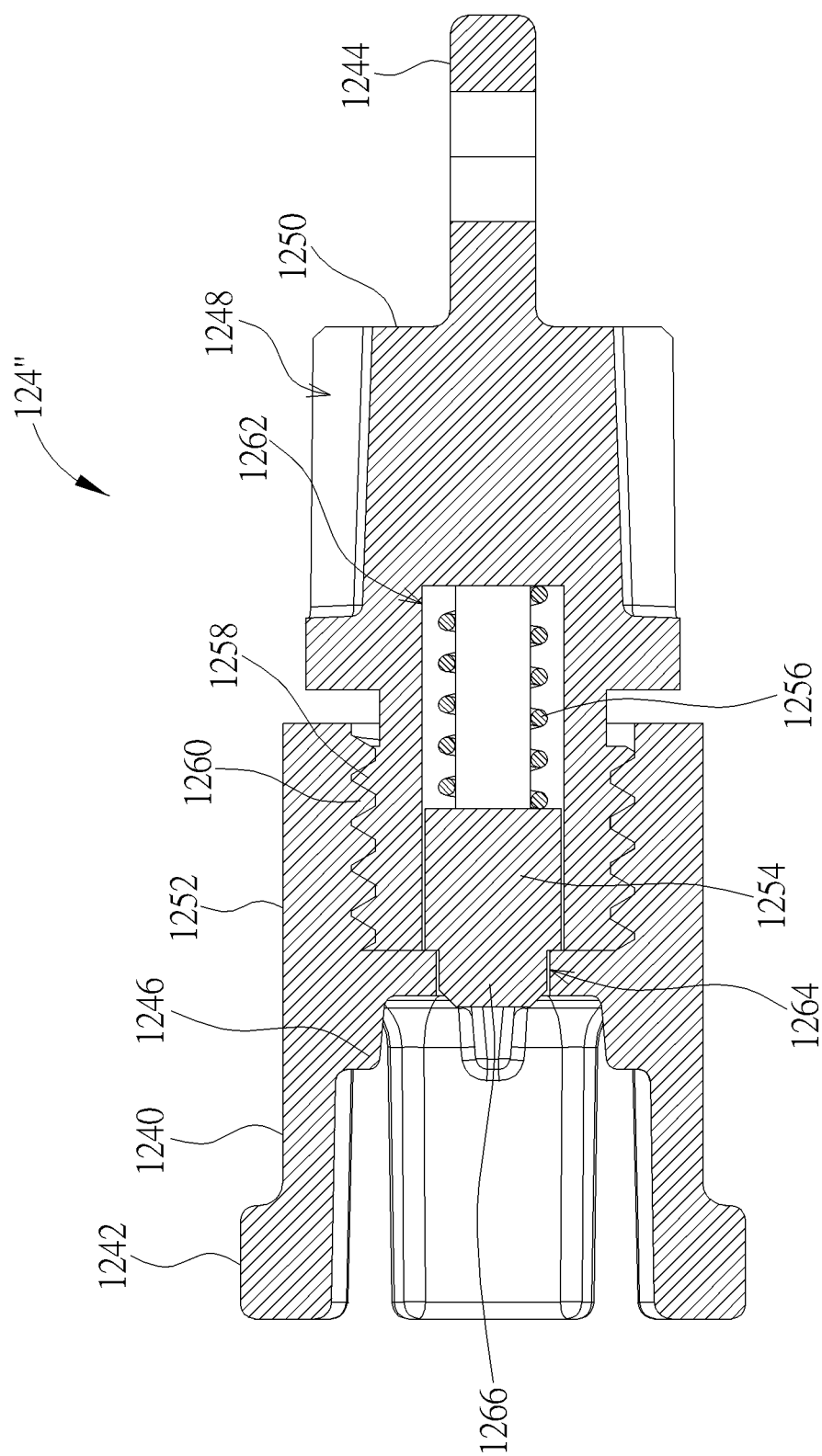
FIG. 15 is a sectional view illustrating the first pivot structure shown in FIG. 12.
Figure 16:
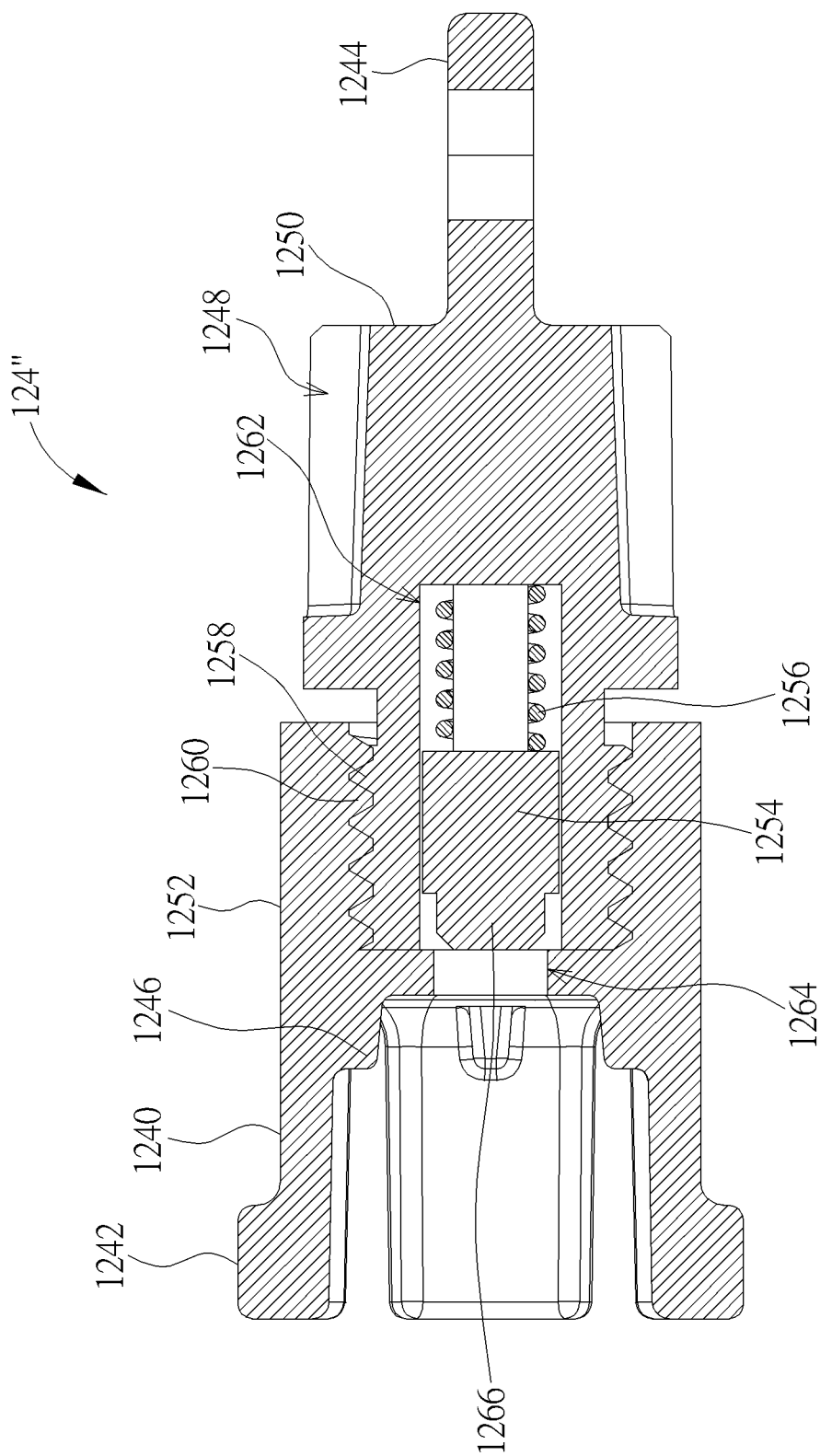
FIG. 16 is a sectional view illustrating a restraining member shown in FIG. 15 being pressed.

Referring to FIGS. 12 to 16, FIG. 12 is a perspective view illustrating a first pivot structure 124" according to another embodiment of the disclosure, FIG. 13 is an exploded view illustrating the first pivot structure 124" shown in FIG. 12, FIG. 14 is a perspective view illustrating a head portion 1252 shown in FIG. 12 from another viewing angle, FIG. 15 is a sectional view illustrating the first pivot structure 124" shown in FIG. 12, and FIG. 16 is a sectional view illustrating a restraining member 1254 shown in FIG. 15 being pressed.

The main difference between the first pivot structure 124" and the aforesaid first pivot structure 124 is that the first pivot structure 124" further comprises a base 1250, a head portion 1252, a restraining member 1254 and an elastic member 1256, as shown in FIGS. 12 to 16. The fixing portion 1244 and the positioning groove 1248 mentioned in the above may be located at the base 1250, and the elastic arm 1240 and the protruding portion 1242 mentioned in the above may be located at the head portion 1252. In this embodiment, the head portion 1252 is detachably connected to the base 1250. For example, the base 1250 may comprise an outer thread 1258 and the head portion 1252 may comprise an inner thread 1260. The inner thread 1260 maybe screwed with the outer thread 1258, such that the head portion 1252 is detachably connected to the base 1250. For further illustration, a user may rotate the head portion 1252 to move the head portion 1252 with respect to the base 1250 by the cooperation between the inner thread 1260 and the outer thread 1258. Accordingly, the user may detach the head portion 1252 from the base 1250 or attach the head portion 1252 to the base 1250.

Furthermore, the base 1250 may comprise an accommodating recess 1262, the head portion 1252 may comprise a restraining hole 1264, and the restraining member 1254 may comprise a restraining portion 1266. As shown in FIG. 15, the restraining member 1254 is movably disposed in the accommodating recess 1262 and the restraining portion 1266 engages with the restraining hole 1264. Still further, the elastic member 1256 is disposed in the accommodating recess 1262 and opposite ends of the elastic member 1256 respectively abut against the restraining member 1254 and the base 1250. In this embodiment, the elastic member 1256 may be, but is not limited to, a spring. After the assembly of the first pivot structure 124" is finished, the elastic member 1256 pushes the restraining member 1254 toward the restraining hole 1264, such that the restraining portion 1266 engages with the restraining hole 1264, so as to prevent the head portion 1252 from rotating with respect to the base 1250. When the user wants to rotate the head portion 1252 to move the head portion 1252 with respect to the base 1250, the user may press the restraining portion 1266 to disengage the restraining portion 1266 from the restraining hole 1264, as shown in FIG. 16. Then, the user can rotate the head portion 1252 to move the head portion 1252 with respect to the base 1250.

Figure 17:
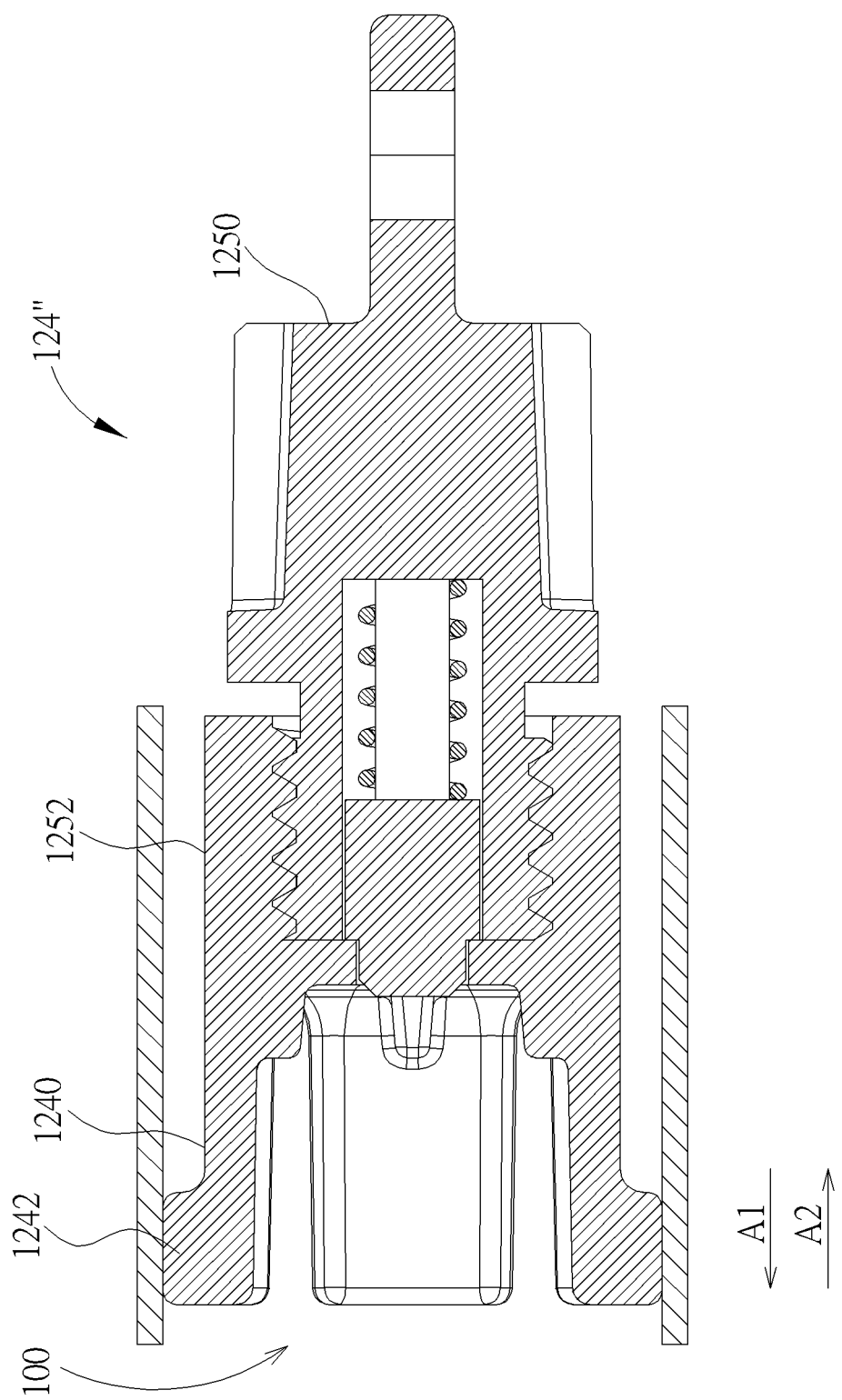
FIG. 17 is a schematic view illustrating the first pivot structure shown in FIG. 16 being disposed in the first pivot hole.

Referring to FIG. 17, FIG. 17 is a schematic view illustrating the first pivot structure 124" shown in FIG. 16 being disposed in the first pivot hole 100. As shown in FIG. 17, a diameter of the first pivot hole 100 is fixed. When the torsion of the first pivot structure 124' decreases due to the abrasion of the first pivot hole 100, the user may rotate the head portion 1252 to move the head portion 1252 with respect to the base 1250 toward a direction of an arrow A1 or A2, so as to adjust the contact position between the protruding portion 1242 and the first pivot hole 100. Accordingly, the torsion of the first pivot structure 124" may be recovered.

Figure 18:
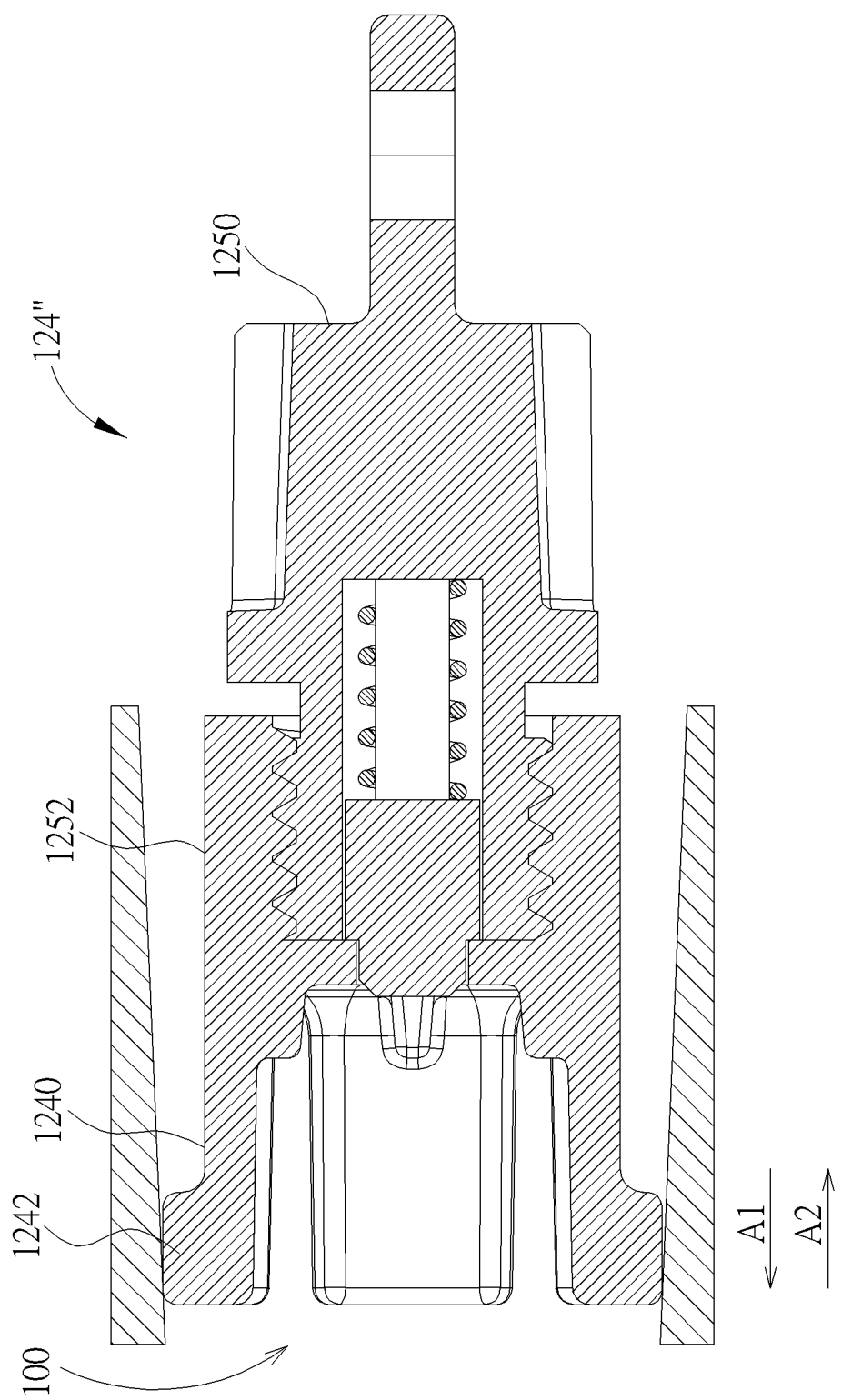
FIG. 18 is another schematic view illustrating the first pivot structure shown in FIG. 16 being disposed in the first pivot hole.

Referring to FIG. 18, FIG. 18 is another schematic view illustrating the first pivot structure 124" shown in FIG. 16 being disposed in the first pivot hole 100. As shown in FIG. 18, a diameter of the first pivot hole 100 gradually decreases from the base 1250 toward the head portion 1252. The user may rotate the head portion 1252 to move the head portion 1252 with respect to the base 1250 toward the direction of the arrow A1, so as to increase an elastic deformation amount of the elastic arm 1240. Accordingly, the kinetic friction may increase to increase the torsion of the first pivot structure 124". On the other hand, the user may rotate the head portion 1252 to move the head portion 1252 with respect to the base 1250 toward the direction of the arrow A2, so as to decrease an elastic deformation amount of the elastic arm 1240. Accordingly, the kinetic friction may decrease to decrease the torsion of the first pivot structure 124". In other words, when the head portion 1252 moves with respect to the base 1250, the elastic deformation amount of the elastic arm 1240 changes as the diameter of the first pivot hole 100 changes to adjust the torsion of the first pivot structure 124".

Figure 19:
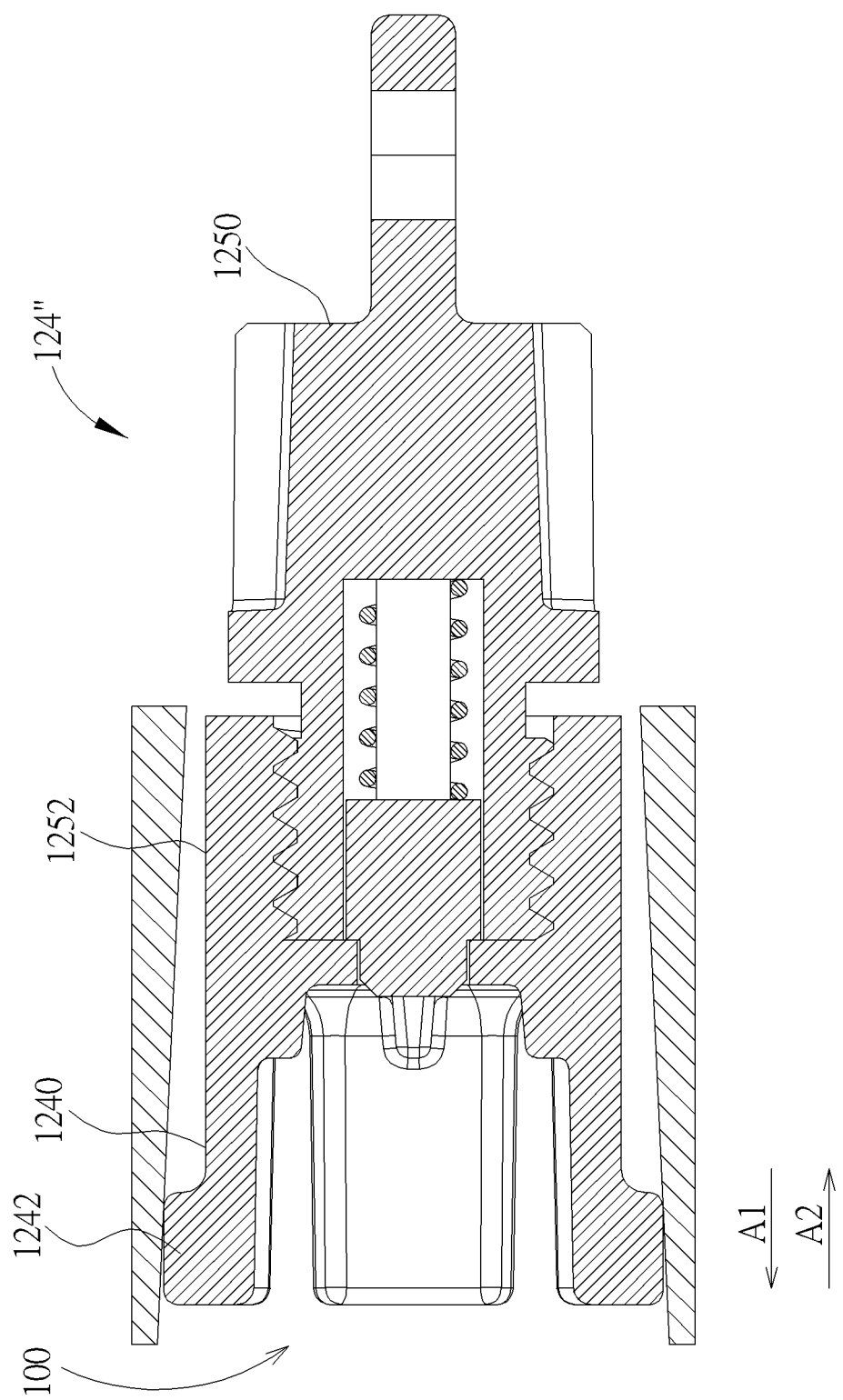
FIG. 19 is another schematic view illustrating the first pivot structure shown in FIG. 16 being disposed in the first pivot hole.

Referring to FIG. 19, FIG. 19 is another schematic view illustrating the first pivot structure 124" shown in FIG. 16 being disposed in the first pivot hole 100. As shown in FIG. 19, a diameter of the first pivot hole 100 gradually increases from the base 1250 toward the head portion 1252. The user may rotate the head portion 1252 to move the head portion 1252 with respect to the base 1250 toward the direction of the arrow A1, so as to decrease an elastic deformation amount of the elastic arm 1240. Accordingly, the kinetic friction may decrease to decrease the torsion of the first pivot structure 124". On the other hand, the user may rotate the head portion 1252 to move the head portion 1252 with respect to the base 1250 toward the direction of the arrow A2, so as to increase an elastic deformation amount of the elastic arm 1240. Accordingly, the kinetic friction may increase to increase the torsion of the first pivot structure 124". In other words, when the head portion 1252 moves with respect to the base 1250, the elastic deformation amount of the elastic arm 1240 changes as the diameter of the first pivot hole 100 changes to adjust the torsion of the first pivot structure 124".

Therefore, according to the embodiments shown in FIGS. 18 and 19, a diameter of the first pivot hole 100 may be not fixed, such that an elastic deformation amount of the elastic arm 1240 changes as the diameter of the first pivot hole 100 changes when the head portion 1252 moves with respect to the base 1250.

The first pivot structure 124 and the second pivot structure 124' mentioned in the above may be replaced by the first pivot structure 124", and the diameters of the first pivot hole 100 and the second pivot hole 102' mentioned in the above may be designed as the diameter of the first pivot hole 100 shown in FIGS. 17 to 19 according to practical applications. When a contact point of the head portion 1252 of the first pivot structure 124" in contact with the first pivot hole 100 is abraded, the user may also rotate the head portion 1252 to detach the head portion 1252 from the base 1250. Then, the user may attach another new head portion 1252 to the base 1250 and then adjusts the torsion of the first pivot structure 124" according to the aforesaid manner.

As mentioned in the above, the pivot structure of the disclosure essentially consists of the elastic arm, the protruding portion and the fixing portion, such that the structure is very simple. Furthermore, the pivot structure is fixed to the fixing structure of the rotating module by the fixing portion, such that it is very convenient for assembly and disassembly. When the rotating module rotates with respect to the device body, the pivot structure provides torsion by friction between the protruding portion on the elastic arm and the pivot hole of the device body, such that the rotating module may stop at a specific position with respect to the device body. Accordingly, the disclosure may adjust the torsion of the pivot structure by changing the material of the pivot structure, the thickness and the width of the elastic arm, and/or the position of the protruding portion, such that the pivot structure is more flexible in use.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device comprising:
 a device body comprising a first pivot hole; and
 a rotating module comprising a first fixing structure and a first pivot structure, the first pivot structure comprising at least one elastic arm, at least one protruding portion, a fixing portion, a base, a head portion, a restraining member and an elastic member, the fixing portion being located at the base, the at least one elastic arm and the at least one protruding portion being located at the head portion, the head portion being detachably connected to the base, the at least one elastic arm and the fixing portion being respectively located at opposite sides of the first pivot structure, the at least one protruding portion respectively extending from the at least one elastic arm, the base comprising an accommodating recess, the head portion comprising a restraining hole, the restraining member being movably disposed in the accommodating recess and engaging with the restraining hole, the elastic member being disposed in the accommodating recess, opposite ends of the elastic member respectively abutting against the restraining member and the base, the fixing portion being fixed to the first fixing structure, the at least one elastic arm being disposed in the first pivot hole, the at least one protruding portion abutting against an inner wall of the first pivot hole.

2. The electronic device of claim 1, wherein the base comprises an outer thread, the head portion comprises an inner thread, and the inner thread is screwed with the outer thread, such that the head portion is detachably connected to the base.

3. The electronic device of claim 1, wherein a diameter of the first pivot hole is not fixed; when the head portion moves with respect to the base, an elastic deformation amount of the at least one elastic arm changes as the diameter of the first pivot hole changes.

4. The electronic device of claim 1, wherein the rotating module further comprises a first through hole, and at least a part of the first pivot structure is located in the first through hole.

5. The electronic device of claim 4, wherein one of the first pivot structure and the first through hole comprises a positioning rib, the other one of the first pivot structure and the first through hole comprises a positioning groove, and the positioning rib cooperates with the positioning groove to position the first pivot structure in the first through hole.

6. The electronic device of claim 1, wherein the device body further comprises a second pivot hole, the rotating module further comprises a pivot portion, the first pivot structure and the pivot portion are respectively located at opposite sides of the rotating module, and the pivot portion is disposed in the second pivot hole.

7. The electronic device of claim 6, wherein the second pivot hole is a C-shaped hole.

8. A rotating module comprising:
a first fixing structure; and
a first pivot structure comprising at least one elastic arm, at least one protruding portion, a fixing portion, a base, a head portion, a restraining member and an elastic member, the fixing portion being located at the base, the at least one elastic arm and the at least one protruding portion being located at the head portion, the head portion being detachably connected to the base, the at least one elastic arm and the fixing portion being respectively located at opposite sides of the first pivot structure, the at least one protruding portion respectively extending from the at least one elastic arm, the base comprising an accommodating recess, the head portion comprising a restraining hole, the restraining member being movably disposed in the accommodating recess and engaging with the restraining hole, the elastic member being disposed in the accommodating recess, opposite ends of the elastic member respectively abutting against the restraining member and the base, the fixing portion being fixed to the first fixing structure.

9. The rotating module of claim 8, wherein the base comprises an outer thread, the head portion comprises an inner thread, and the inner thread is screwed with the outer thread, such that the head portion is detachably connected to the base.

10. The rotating module of claim 8, further comprising a first through hole, at least a part of the first pivot structure being located in the first through hole.

11. The rotating module of claim 10, wherein one of the first pivot structure and the first through hole comprises a positioning rib, the other one of the first pivot structure and the first through hole comprises a positioning groove, and the positioning rib cooperates with the positioning groove to position the first pivot structure in the first through hole.

12. The rotating module of claim 8, wherein the rotating module further comprises a pivot portion, and the first pivot structure and the pivot portion are respectively located at opposite sides of the rotating module.

13. A pivot structure comprising:
a base comprising an accommodating recess;
a head portion detachably connected to the base, the head portion comprising a restraining hole;
at least one elastic arm located at the head portion;
at least one protruding portion located at the head portion and respectively extending from the at least one elastic arm;
a fixing portion located at the base, the at least one elastic arm and the fixing portion being respectively located at opposite sides of the pivot structure;
a restraining member movably disposed in the accommodating recess and engaging with the restraining hole; and
an elastic member disposed in the accommodating recess, opposite ends of the elastic member respectively abutting against the restraining member and the base.

14. The pivot structure of claim 13, wherein the base comprises an outer thread, the head portion comprises an inner thread, and the inner thread is screwed with the outer thread, such that the head portion is detachably connected to the base.

15. The pivot structure of claim 13, further comprising a positioning rib or a positioning groove, the positioning rib or the positioning groove being located between the at least one elastic arm and the fixing portion.

16. An electronic device comprising:
a device body comprising a first pivot hole; and
a rotating module comprising a first fixing structure and a first pivot structure, the first pivot structure comprising at least one elastic arm, at least one protruding portion, a fixing portion, a base and a head portion, the fixing portion being located at the base, the at least one elastic arm and the at least one protruding portion being located at the head portion, the head portion being detachably connected to the base, the at least one elastic arm and the fixing portion being respectively located at opposite sides of the first pivot structure, the at least one protruding portion respectively extending from the at least one elastic arm, the fixing portion being fixed to the first fixing structure, the at least one elastic arm being disposed in the first pivot hole, the at least one protruding portion abutting against an inner wall of the first pivot hole;
wherein a diameter of the first pivot hole is not fixed; when the head portion moves with respect to the base, an elastic deformation amount of the at least one elastic arm changes as the diameter of the first pivot hole changes.

* * * * *